Dec. 11, 1923.
C. P. LEE
1,476,823
GANG PLOW
Filed Dec. 23, 1921
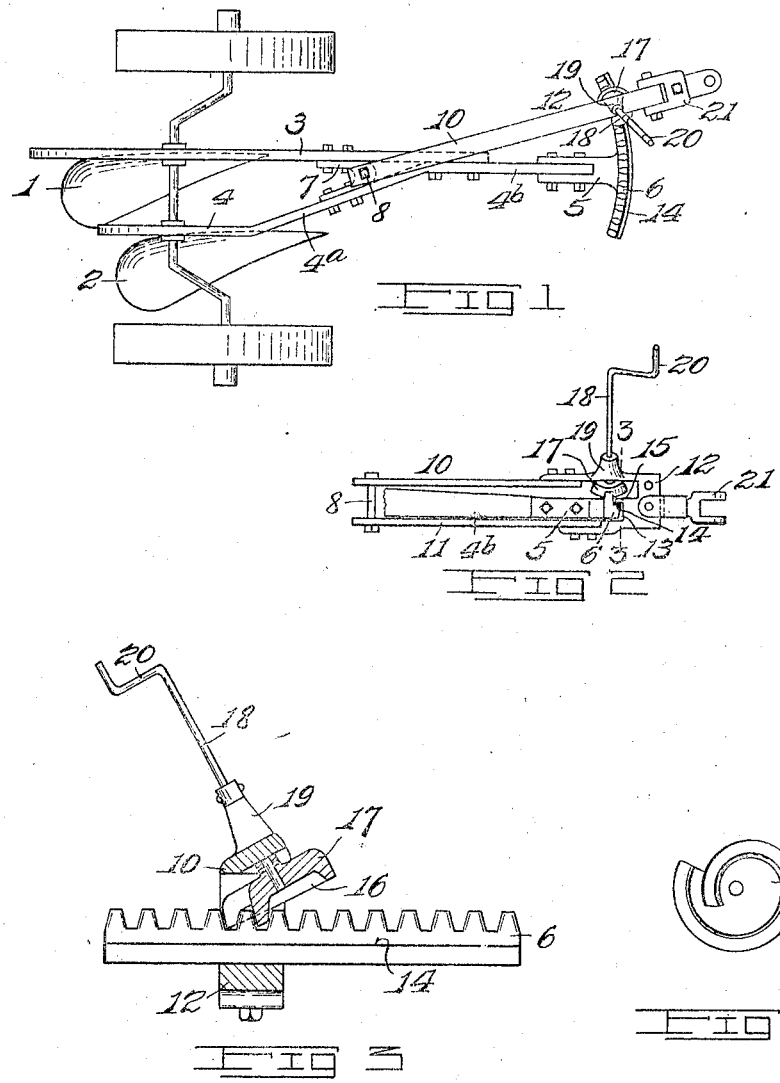
Charles P. Lee, Inventor
By N. E. Duncan, Attorney Patented Dec. 11, 1923.

1,476,823

UNITED STATES PATENT OFFICE.

CHARLES P. LEE, OF ST. CLAIRSVILLE, OHIO.

GANG PLOW.

Application filed December 23, 1921. Serial No. 524,405.

*To all whom it may concern:*

Be it known that I, CHARLES P. LEE, a citizen of the United States of America, and resident of St. Clairsville, county of Belmont, and State of Ohio, have invented certain new and useful Improvements in Gang Plows, of which the following is a specification.

This invention relates primarily to gang plows of the mold-board type, and more particularly to an adjustable tractor hitch for plows and other tractor-drawn mechanisms.

The primary object of the invention is to provide a hitch mechanism by means of which the working angle of the plow bodies, or other tractor-drawn mechanism, may be adjusted laterally to dispose the mechanism angularly with respect to the line of draft.

A further object is to provide a device of the character referred to which is simple and comparatively inexpensive in construction and which provides for practically instantaneous adjustment.

In describing the invention in detail, reference is herein had to the acompanying drawings, in which—

Figure 1 is a top plan view of a tractor plow embodying, or equipped with, my invention;

Figure 2 is a side elevation of the adjustable hitch mechanism;

Figure 3 is an enlarged sectional elevation, the section being taken substantially on line 3—3, Fig. 2; and—

Figure 4 is a plan view of the fact of the worm-bearing head of the rotary adjusting device.

Referring to said drawings, 1 and 2 indicate two plow bodies forming a part of a tractor plow of a more or less common commercial type, the same being carried by a frame comprising beams 3 and 4, respectively. The beam 4 has an intermediate portion 4ª thereof inclined toward and meeting the front end portion of the beam 3 and is rigidly attached to the latter, as by means of bolts. The front end portion 4ᵇ of said beam 4 extends forward in substantial alinement with said beam 3 and substantially in the axial line of the frame or in the line of draft. Rigidly attached to the front end portion 4ᵇ is a rearwardly directed arm 5 carried by the middle portion of a transversely extending rack-bar 6 of arcuate form.

Disposed between the beam 3 and the inclined portion 4ª of the beam 4 adjacent to the meeting angle thereof is a bracket 7 of substantially V-shape which has the opposite members thereof bolted to said beams, as shown. A pivot-pin or bolt 8 projected vertically through the angle end of said bracket constitutes a means of attachment for the rear ends of parallel members 10 and 11 forming parts of a draw-bar which is designated generally by the numeral 12.

Said members 10 and 11 are separated such a distance that free relative movement of the draw-bar 12 with respect to the plow beams is permitted—that is, free lateral movement of the draw-bar in straddling relation to the front end portions of the beams is allowed—for effecting the adjustment which will hereinafter be explained.

The head portion of the draw-bar has therein a transverse channel 13 in which the beam-carried rack-bar 6 is received and through which said rack-bar has its movement in carrying out the adjustment referred to. The teeth of said rack-bar are located on its upper face, and a ledge 14 on the front face of said rack-bar rides beneath an overhanging lip 15 which forms the upper defining wall of the channel 13.

Disposed in engagement with teeth of the rack-bar is a worm 16 of open-coil shape formed on the under face of a head-like member 17 which is fixed upon the lower end of a rod or shaft 18. Said shaft is rotatable in a bearing 19 formed on the upper part of the head of the draw-bar 12. Said bearing and, consequently, said shaft are inclined with respect to the vertical so that the head 17 borne by the shaft is maintained inclined with respect to the horizontally disposed rack-bar. Thus, there is at all times presented to the rack-bar one portion only of the worm 16, the diametrically opposite portion or portions being elevated out of operative relation to the rack-bar, as shown in Fig. 3. A crank 20 formed on the upper end of the shaft 18 provides means whereby the latter may be rotated by hand.

A clevis 21 or other suitable device is mounted on the head-end of the draw-bar, the same affording means for attaching a tractor.

In practice, the width of furrow turned over by the plow bodies 1 and 2 is regulated by adjustment of the draw-bar 12 with respect to the rack-bar 6. As is apparent, when the draw-bar is in substantial alinement with the normal lines of draft applied through the plow-beams, the plow bodies tend to move straight ahead. However, if it be desired to decrease the width of the furrows the draw-bar is shifted inward to or toward the position shown in Fig. 1, thus shifting the line of draft to the extent that the plow bodies are disposed at an angle inclined outward with respect to said line of draft. Or, when it is desired to increase the width of the furrows, the draw-bar is shifted in the reverse direction so that the plow bodies toe inward out of parallel to the line of draft. This shifting or adjustment is effected by rotation of the shaft 18 and, consequently, the worm-bearing head 17 to produce transverse travel of the rack-bar through the draw-bar head.

What is claimed is—

1. In a gang plow, a beam, a second beam having a part thereof angularly disposed with respect to the first beam and connected thereto and terminating in a part extending beyond the first beam, a rack bar carried by said extended part of the beam, a draw bar pivotally connected to said bars behind said rack bar, said draw bar having means comprising a guide for relative movement between the draw bar and the rack bar, and a worm gear for moving said draw bar in relation to said rack bar.

2. In a gang plow, in combination with beams, a draw bar pivotally connected to said beams, a rack bar carried by one of said beams, means for moving said rack bar with relation to the draw bar comprising a worm gear fixed to a shaft journalled in said draw bar, said shaft being inclined to the rack bar whereby one portion only of the gear is in operative relation to the rack bar.

3. In combination with a frame, a rack bar carried by the frame, a draw bar pivotally connected to the frame behind the rack bar, said draw bar being provided with a head portion having means comprising a guide for relative motion between the draw bar and the rack bar, a bearing in said draw bar angularly disposed with respect to the rack bar, a shaft journalled in said bearing, an open coil worm gear fixed to said shaft and having only one portion meshing with the rack bar, and means for rotating said shaft.

In testimony whereof, I affix my signature in presence of two subscribing witnesses.

CHARLES P. LEE.

Witnesses:
H. E. DUNLAP,
CHARLES P. SCHLICK.